United States Patent
Searle et al.

(10) Patent No.: US 9,429,446 B1
(45) Date of Patent: Aug. 30, 2016

(54) NAVIGATION DEVICE FOR THE VISUALLY-IMPAIRED

(71) Applicants: Conley Searle, Rock Springs, WY (US); Stoney Searle, Rock Springs, WY (US); Jared Holbrook, Bakersfield, CA (US)

(72) Inventors: Conley Searle, Rock Springs, WY (US); Stoney Searle, Rock Springs, WY (US); Jared Holbrook, Bakersfield, CA (US)

( * ) Notice: Subject to any disclaimer, the term of this patent is extended or adjusted under 35 U.S.C. 154(b) by 0 days.

(21) Appl. No.: 14/658,506

(22) Filed: Mar. 16, 2015

(51) Int. Cl.
*G01C 21/00* (2006.01)
*A61H 3/06* (2006.01)
*G09B 21/00* (2006.01)
*G01C 21/36* (2006.01)

(52) U.S. Cl.
CPC .................. *G01C 21/3629* (2013.01)

(58) Field of Classification Search
CPC combination set(s) only.
See application file for complete search history.

(56) References Cited

U.S. PATENT DOCUMENTS

| | | | |
|---|---|---|---|
| 9,081,494 B2* | 7/2015 | Migos | G06F 3/04883 |
| 9,098,182 B2* | 8/2015 | Migos | G06F 3/0486 |
| 2005/0085257 A1* | 4/2005 | Laird | A61B 5/04 455/550.1 |
| 2011/0172907 A1* | 7/2011 | Rui Da Silva Freitas | G09B 5/04 701/533 |
| 2011/0195758 A1* | 8/2011 | Damale | H04M 1/6075 455/569.1 |
| 2013/0013314 A1* | 1/2013 | Boschker | G10L 13/00 704/260 |
| 2014/0198068 A1* | 7/2014 | Lee | G06F 3/016 345/173 |
| 2014/0364108 A1* | 12/2014 | Tibbitts | H04W 48/04 455/419 |
| 2015/0204561 A1* | 7/2015 | Sadwick | F24F 11/006 236/1 C |

* cited by examiner

*Primary Examiner* — Yonel Beaulieu
(74) *Attorney, Agent, or Firm* — R. Scott Kimsey, Esq.; Klein DeNatale Goldner

(57) ABSTRACT

A hand-held device for allowing the visually-impaired to navigate an environment includes a housing defining an interior space of the device. The device recognizes the position of objects in the environment external to the device and is programmed to determine a path through the objects. A speaker delivers audio instructions to a user of the device regarding the pathway through the objects. A method of navigating through such objects is provided by the device.

15 Claims, 3 Drawing Sheets

NAVIGATION DEVICE FOR THE VISUALLY-IMPAIRED

RELATED APPLICATIONS

Not Applicable

BACKGROUND AND FIELD

1. Field

The present disclosure relates generally to a device for aiding the visually-impaired, and more specifically to a navigation device for providing autonomy and mobility to the visually-impaired.

2. Background

Approximately 246 million people in the world suffer some form of visual impairment. Of these, around 39 million suffer from total blindness. A variety of means have been used, traditionally, to assist the visually-impaired in getting around as part of their daily lives. Such means include guide dogs, canes, memorization of locations in which the person will be traveling, and simple methods such as using twine or other objects to create paths that a visually-impaired person can follow in navigating a home, office, or other area.

Guide dogs can be expensive, and come with the responsibilities associated with caring for an animal. Canes may be useful in some circumstances, but are not ideal and can be dangerous to the visually-impaired individual in some circumstances. Memorizing the layout of an area is practical for only a few locations, and the usefulness of such an approach is limited in that changes to the memorized layout, such as, for example, movement of furniture, requires time on the part of the visually-impaired individual to learn the new layout. Ropes, twine, or other physical means of defining a path through an environment are time-consuming, inefficient, and can present obstacles to normal movement, both for the visually-impaired individual as well as others using the same space.

SUMMARY

A hand-held device for allowing the visually-impaired to navigate an environment includes a housing defining an interior space of the device, an object location means contained within or upon the housing and having access to an environment external to the housing, a processor in electronic communication with the object location means and programmed to receive information from the object location means, and a speaker in electronic communication with the processor for delivering audio information to a user of the hand-held device.

The object location means may include a camera, a radio module, a sonar module, an infrared module, and combinations thereof.

The hand-held device may also include an internal storage from which navigation data sets may be loaded.

The hand-held device may also include network connection capability so that navigation data sets may be downloaded from a network.

The hand-held device may also include the capability of recognizing text and converting the recognized text to audio form for transmission to the user.

The hand-held device may also include a network communications capability for two-way communication with a public or private network.

The network communications may be configured to communication via a hard-wired network connection, or via Wi-Fi, satellite, or cellular communications.

The hand-held device may also include emergency communications capability, wherein actuation of the emergency communications capability causes the hand-held device to connect to an emergency communications network.

A hand-held device for allowing a visually-impaired individual to navigate an environment may include a housing, a camera attached to the housing, a radio module attached to the housing, a processor in electronic communication with the camera and radio module, and a speaker in electronic communication with the processor for delivering instructions to the user of the hand-held device. The hand-held device may be a dedicated device used only for navigation and related functions by the visually-impaired user. The device may be programmed to recognize the position of objects via the radio module and camera, and to provide the user with audio instructions, via the speaker, for navigating the detected objects.

A method of navigating an environment includes the steps of using a hand-held device to acquire information relating to the position of a plurality of objects within the environment, processing that information using the hand-held device, such that the hand-held device determines a navigation path through the plurality of objects, and delivering in audio form, with the hand-held device, instructions to the user relating to the path for navigating through the plurality of objects.

The step of acquiring information about the environment to be navigated may include downloading the information from a network.

The step of acquiring information about the environment may also include direct, real-time acquisition of information about the user's environment by the hand-held device (such as, for example, through a camera, radio module, sonar module, infrared module, or the like), and the method may further include the step of rectifying the information downloaded from the network with the real-time information acquired directly by the hand-held device.

The method may also include the step of tagging a plurality of objects in the environment, the tags used being such that the hand-held device can communicate with them and thereby determine the location of the objects.

DETAILED DESCRIPTION

Figure 1:
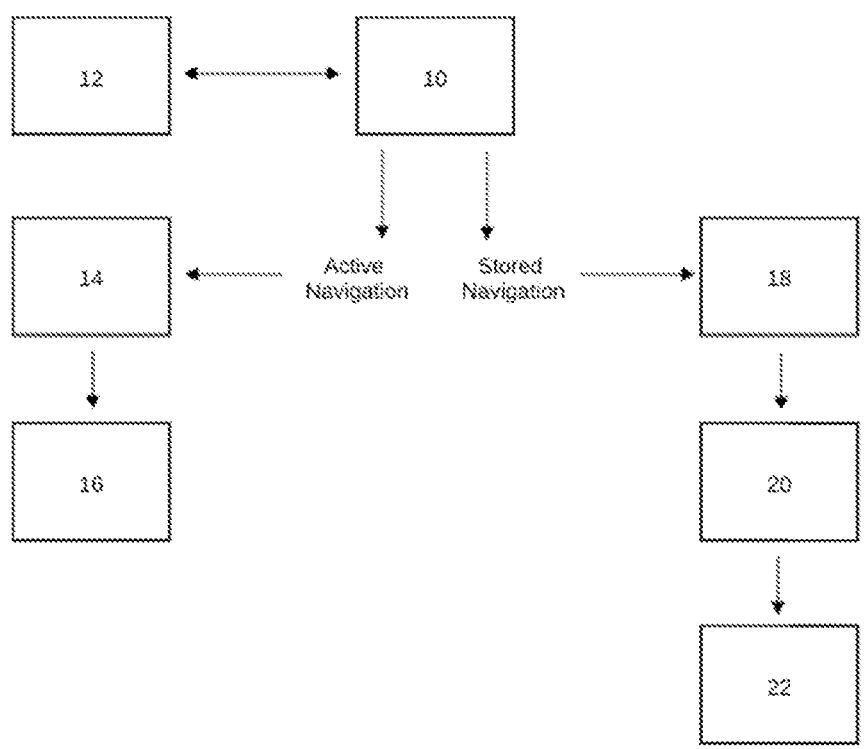
FIG. 1 is a flowchart illustrating the functionality of certain embodiments of a navigation device for the visually-impaired.

Turning to the drawings, wherein like numerals indicate like parts, FIG. 1 is a flowchart illustrating the functionality of certain embodiments of a navigation device for the visually-impaired. The functionality is provided to a user of the present navigation device via hand-held device 10, described in more detail below.

When hand-held device 10 is activated, the device may load into memory a stored layout from database 12, which may be the internal storage of hand-held device 10, or which may be a remote database accessed over a wired or wireless connection, such as via an ethernet connection, Wi-Fi, or a cellular network connection. If information is available in a database, it may be loaded automatically, with hand-held device 10 using GPS or other location functionality to determine the proper information to load, based on the location of the user of the device. Alternatively, the user of the device may issue voice commands, and receive voice responses from hand-held device 10, in order to load the proper information based on the needs or desires of the user at a given time. If no stored information is available in storage 12, no information will be downloaded and the device will proceed to function as described below. Even if information is available in storage 12, the user of hand-held device 10 may opt not to load the information, or may instruct the device not to query storage 12.

If hand-held device 10 has loaded information from storage 12, device 10 will typically proceed along the "stored navigation" path indicated in FIG. 1. The stored information loaded from storage 12 will preferably contain all of the necessary information about the location in which the user is functioning, and it is contemplated that this information will generally pertain to a location in which the user is frequently present, such as a home or workplace. It is contemplated, however, that the information stored in storage 12 may pertain to a location in which the user has never previously functioned. For example, third-party businesses, government agencies, and the like, may make such information available for download to hand-held device 10, so that when a user of device 10 travels to a new location, device 10 will already have the necessary information to allow them to navigate. Such third-party locations could relate, for example, to schools, museums, businesses, and the like, such that a user who knows he will travel to the location at a future date can access the stored information via the internet and download it to hand-held device 10 prior to making a trip to the location. Hand-held device 10 may, at any given time, contain pre-loaded information for a variety of locations.

Following the "stored navigation" path, selection among the data sets of information loaded from storage 12, if necessary, occurs in step 18. If only one data set is loaded from storage 12, selection step 18 will not be necessary. However, in some instances, device 10 may determine that there are multiple data sets stored and available for a user's given location, in which case device 10 preferably loads all of the relevant information, and the correct data set for navigation at the user's current location is selected during the selection step 18.

Selection step 18 may be performed automatically. For example, hand-held device 10 may rely on GPS functionality to determine the location of the user, and based on the user's geolocation information device 10 may select the appropriate pre-loaded information to use for purposes of navigation. Alternatively, the user of hand-held device 10 may, through a series of voice commands and voice responses, select a desired set of pre-loaded information to serve as a basis for navigation. Although GPS functionality is preferred, it is contemplated that some embodiments of hand-held device 10 may lack GPS functionality. In such instances, the user will also select the navigation information to be loaded via a series of voice commands and voice responses.

After selection step 18, a rectification step 20 may optionally be performed. In the rectification step, hand-held device 10 makes use of its local capabilities, such as, for example, cameras, radio signals, infrared, and/or sonar (described in more detail below) to seek out any discrepancies between the pre-loaded information and the immediate environment of the user of hand-held device 10. This step protects against any changes in the location of objects, such as, for example, furniture, that occurred between the time the pre-loaded information was gathered and the time the user of hand-held device 10 is at the location being navigated.

Once information loaded into hand-held device 10 has been selected, and device 10 has rectified any discrepancies between the pre-loaded information and the area to be navigated, the user of device 10 is ready to navigate, as shown via navigation step 22. Navigation instructions are provided to the user of device 10 via voice instructions. The voice instructions may provide any of a wide variety of information to the user, including information regarding how many steps to take, and in which direction, when to turn, when the user may be nearing an obstacle or other hazard, and so on. The user may provide voice commands to hand-held device 10 to instruct the device as to where, precisely, the user wishes to go.

Following the "active navigation" path results in many of the same processes described above, except that there is no pre-loaded data on which hand-held device 10 may rely. With no pre-loaded information, hand-held device 10 proceeds to data acquisition step 14. During acquisition step 14, hand-held device 10 makes use of any of a number of functionalities described in greater detail, below. These may include GPS technology, RFID, infrared, sonar, cameras, radio waves, and the like. The purpose of acquisition step 14 is for hand-held device 10 to gather information about the immediate environment of the user. Thus, camera, sonar, infrared, or related functionality may be used to identify obstacles in the vicinity of the user, so that the user may be alerted to the presence of those obstacles and hand-held device 10 may calculate a path around the obstacles if necessary. If RFID or other tags have been distributed throughout the location prior to the user arriving to navigate the area, hand-held device 10 will acquire information relating to those tags and also use that information to make determinations about a proper navigation path, placement of obstacles, and the like. Once the necessary information is acquired, the hand-held device moves to navigation step 16, which functions in the same manner as navigation step 22, described above.

It should be noted that acquisitions steps 14 and 20, and navigation steps 16 and 22 are preferably ongoing, in real time, as the user navigates via hand-held device 10. In other words, hand-held device 10 is preferably acquiring information about the local environment continuously, and then using that information to provide navigation instructions to the user of hand-held device 10. As the user moves throughout the environment, hand-held device 10 keeps track of the user's location, updating its navigation information based on new and/or pre-loaded data as necessary.

Figure 2:
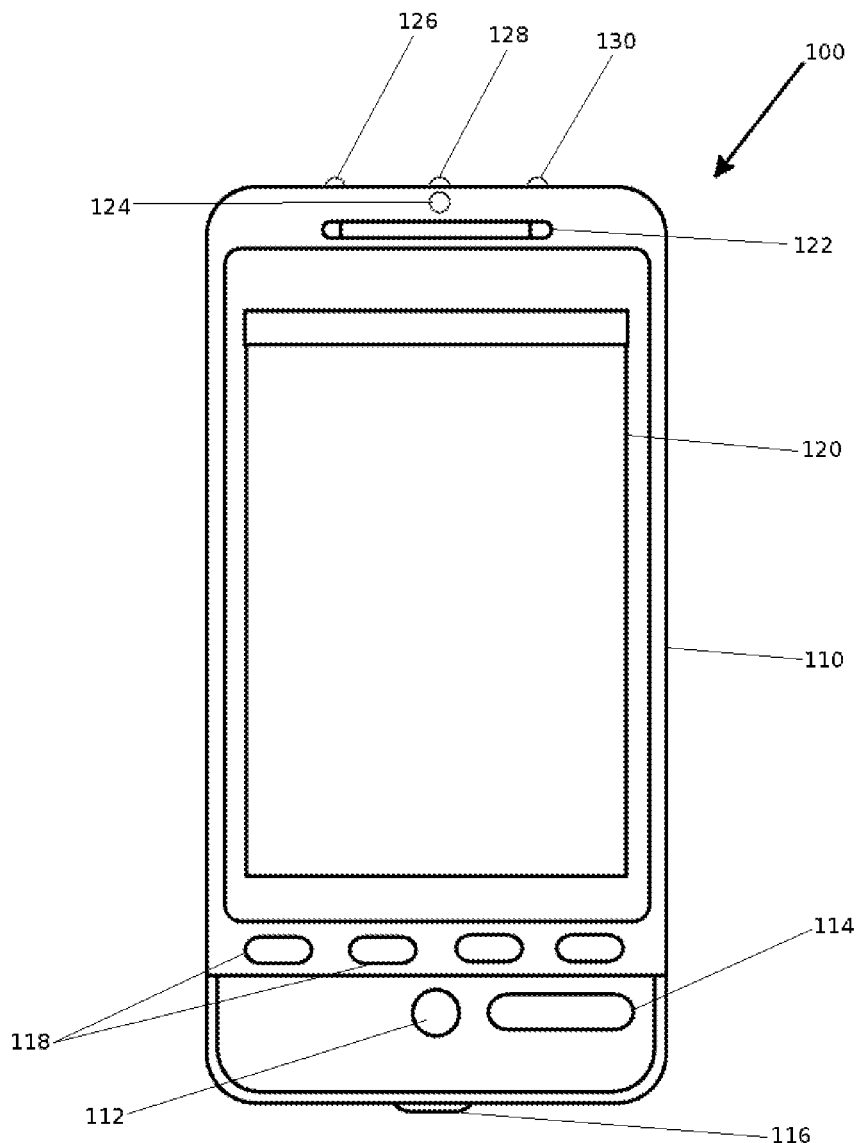
FIG. 2 is an exemplary drawing of one embodiment of a hand-held navigation device for the visually-impaired.

FIG. 2 provides an illustration of one embodiment of a hand-held navigation device 100. The embodiment shown in FIG. 2 includes a display 120, for reasons made clear below, however it is contemplated that not all embodiments of a hand-held navigation device will include a visual display.

The embodiment of hand-held navigation device 100 shown in FIG. 2 includes a housing 110, on or in which the various components of the device are found. A power button 112 is used to turn the device on and off. Because the device is voice-controlled, a volume rocker 114 is provided to allow the user to set the volume of device 100 to a level that the user can hear, even when the user is in busy outdoor environments that may contain a lot of ambient noise.

Speaker/microphone combination 122 allows hand-held device 100 to receive commands from the user, and also to issue navigation and other instructions to the user.

Buttons 118 may be provided for a number of ancillary functions desirable in hand-held device 100. For example, these buttons may allow the user to execute manual commands when necessary, to navigate through stored data or other selections offered by hand-held device 100, or to execute any other necessary or desirable commands that the user may wish to perform manually. In some embodiments of hand-held device 100, buttons 118 may be mapped to various functions selected by the user. It is preferred that buttons 118 are tactile, and they may include Braille markings or other tactile markings to inform the user about the function of the button. While it is contemplated that navigation buttons could be provided on display 120, if display 120 is a touchscreen, navigation through a touchscreen display is less than ideal for the visually-impaired, even if the user has memorized the location of the touchscreen buttons on the display. Thus, tactile buttons 118 are preferred to the extent buttons are necessary or desirable. Some embodiments of hand-held device 100 may forego such buttons entirely and rely solely on voice control.

The bottom of hand-held device 100 includes a charging port 116 so that the user of hand-held device 100 can maintain the battery in a charged state. It is contemplated that any suitable battery type and style of charging port may be provided, and that such features are known in the art of hand-held devices. Exemplary batteries that may be used are lithium polymer batteries, lithium ion batteries, and nickel cadmium batteries. Exemplary charging ports include USB, mini-USB, and micro-USB ports.

Various components used for navigation and data acquisition by hand-held device 100 are located near the top of the device in the view shown in FIG. 2. These include a camera 124, radio module 126, sonar module 128, and infrared module 130. Each of the radio module 126, sonar module 128, and infrared module 130 is equipped to send and receive information of a type appropriate to the respective module. The word "module" is included herein to include all of the various components necessary to render the radio, sonar, or infrared module operational in sending and receiving data, those various components being known in the art.

Camera 124 may be of any suitable type commonly associated with hand-held devices. As shown in FIG. 2, camera 124 is positioned on the top face of hand-held device 100, and a user of device 100 simply directs camera 124 at the environment surrounding the user in order to acquire data. It is contemplated that the camera may be on the bottom or rear face of hand-held device 100, or may be located along the perimeter edge of device 100.

Radio module 126 is provided at or near the perimeter edge of hand-held device 100, though it is contemplated that any suitable position may be used. Any of a variety of radio wave capabilities may be used, including RFID, Bluetooth, or a combination of these. Radio module 126 is used in locations where obstacles or other features of the environment being navigated by a user are tagged with RFID tags, Bluetooth® transmitters, or the like. In the case of RFID, the tags may be active or passive. An advantage to such a tagging system is that hand-held device 100 is able to identify tagged items, in real time, as the user is navigating. If obstacles, such as furniture, are moved, the corresponding tag on the obstacle also changes position, and this change in position is recognized by hand-held device 100.

Sonar module 128 uses sound propagation for navigation and ranging. Echo-location techniques may be used to identify obstacles, and their distances from hand-held device 100. When coupled with transponders, sonar module 128 allows hand-held device 100 to navigate through a given area based on transponder signals received by the device.

Infrared module 130 measures light in the infrared spectrum radiating from objects in the module's "field of view." Infrared module 130 is preferably a passive infrared sensor (PIR) that can be used as a motion detector, a means of distinguishing living organisms from inanimate obstacles, and also a means for identifying heat sources. Because living organisms give off greater infrared light than an inanimate background, the infrared module 130 can distinguish between the two, and this allows hand-held device 100 to ascertain movement and assist a user with navigation through, for example, a crowd. Infrared module 130 may also alert a user to heat sources, such as the heat emanating from a stove. While other navigation modules of the present device may detect the presence of the stove, they will not be able to ascertain whether the stove is on or off. A visually-impaired user may be unable to see whether the stove is on or off, in which case the user has to come very near to the stove to feel whether it is hot. Infrared module 130 can ascertain the status of the stove or other heat source before a user moves close enough to risk injury.

An exemplary situation in which a user might navigate is now provided to more clearly illustrate the principles underlying the navigation device for the visually-impaired.

Example 1

Home Navigation

Figure 3:
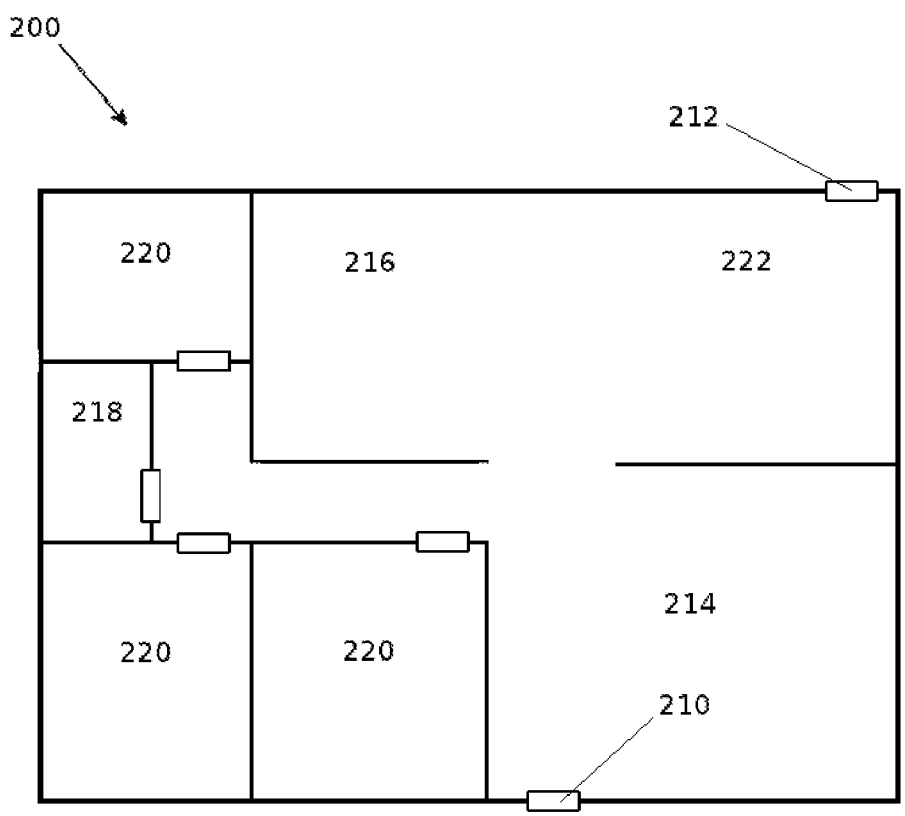
FIG. 3 is an exemplary home location through which a visually-impaired user may navigate using a hand-held navigation device.

Navigation is now described as applied to an exemplary home location, as shown in FIG. 3. The home depicted in the drawing includes only a small number of locations, and it is contemplated that any number of additional or different locations may be used in the actual navigation of a home or different environment. For purposes of this example, home 200 includes a front entry 210, rear entry 212, living room 214, kitchen 216, bathroom 218, and bedrooms 220. A user of hand-held device 10 may have the location of these various areas pre-stored in device 10, and the user can cause device 10 to load this pre-stored information as described above. Alternatively, the user may actively navigate the area, such as when the user is navigating the area for the first time, and may choose to store the resultant information in hand-held device 10.

The user may wake in the morning, in top bedroom 220, and, through, voice command, instruct hand-held device 10 that the user wishes to navigate to bathroom 218. Hand-held device 10 will instruct the user to take the appropriate number of steps in a first direction, then to turn and take the appropriate number of steps in a second direction, thereby arriving at bathroom 218. If RFID or other tags are present in bedroom 220, hand-held device 10 may rely on those tags to help the user orient himself to the correct position prior to taking any steps, thus ensuring that once the user begins walking he is walking in the correct direction. Alternatively, hand-held device 10 may make use of cameras, sonar information, or any other suitable information to ensure that the user is facing the right direction prior to navigation. If the user is not facing the right direction, hand-held device 10 will issue voice commands that instruct the user to turn, indicate the direction to be turned, and indicate how far the user should turn. These voice commands can be given until the user is facing in the correct direction. Hand-held device 10 will also make use of object detection functionality, such as cameras, radio modules, sonar modules, and/or infrared modules to assist the user in avoiding obstacles in the bedroom, such as a bed or a dresser.

In exemplary home 200, once the user is facing in the proper direction, hand-held device 10 will instruct the user to walk forward an appropriate number of steps to leave bedroom 200 and enter the hallway. As the user walks forward, hand-held device 10 will use camera, sonar, or other suitable technology to determine whether any obstacles are in the user's way. If the user lives with others, for example, obstacles may be left in the user's path that are not reflected in the pre-stored information. If an obstacle is present, hand-held device 10 will instruct the user to stop, turn, or otherwise avoid the obstacle as necessary.

After moving forward the appropriate number of steps, the user will be located in a hallway of home 200, just outside of bathroom 218. Hand-held device 10 will then instruct the user to turn to his right, and using previously described techniques will continue to provide commands relating to turning or orienting the user until the user is facing the direction of bathroom 218. Once the user is facing the correct direction, hand-held device 10 will instruct the user to move forward an additional number of steps. Again, hand-held device 10 will check the area into which the user is moving for obstacles, and respond appropriately. If the door to bathroom 218 is closed, hand-held device 10 may instruct the user to move forward fewer steps, or simply issue a command to stop as the user reaches the door. Hand-held device 10 may then, via voice instruction, alert the user to the fact that the door is closed. Once the user opens the door, navigation can resume. Once in the bathroom, hand-held device 10 can alert the user to the position of various objects therein.

When the user wishes to leave bathroom 218, hand-held device 10 once again orients the user appropriately via voice instruction. This ensures that the user is oriented to move through the doorway when the user begins walking. Again, hand-held device 10 will alert the user if the door to bathroom 218 is closed. The user may then select, preferably through voice command, his next destination. In this case, the next exemplary destination may be the kitchen, and having received a command to navigate to the kitchen, hand-held device 10 will instruct the user to move along the hallway toward living room 214, the hand-held device checking for obstacles along the way. Once the user has emerged into the area of living room 214, the hand-held device will instruct the user to turn left, issuing correctional commands until the user is appropriately oriented, at which point the hand-held device will instruct the user to move forward. Once in the area between kitchen 216 and dining room 222, the hand-held device will issue commands as appropriate to allow the user to navigate to the specific areas he wishes to travel to.

In addition to the direct navigation functionality described above, a hand-held device 10 may provide additional information to a user thereof, such as information about hazards in the user's immediate area. For example, through its various navigation features, hand-held device 10 may alert a user when the user is moving near a construction zone or other hazardous work zone. Hand-held device 10 may also alert a user when a sidewalk is cracked or contains holes, when a portion of it is raised, when the sidewalk is coming to an end, or when the user is approaching a road. Any hazard that is capable of being detected by the various information-receiving functions of hand-held device 10 may be identified by hand-held device 10 and an appropriate warning given to the user via voice instruction.

The camera function of hand-held device 10 may also aid a user in navigation or other life tasks in ways that differ from simply identifying obstacles in the user's path. For example, a user may encounter road signs or other signs or written insignia during navigation outside of the home. Such signs may include street signs, signs identifying businesses, direction signs in libraries, museums, amusement parks, or various business, and the like. Some embodiments of hand-held device 10 may include functionality that allows hand-held device 10 to interpret text captured by the camera, and to read that text to a user of hand-held device 10. Thus, a user of hand-held device 10 is able to make use of the same information that someone with full vision might use, aiding their ability to get around more efficiently and more independently. In hand-held devices 10 with this functionality, the camera may likewise be used to read restaurant menus or other text as necessary or desired by the user.

Hand-held device 10 may, in some embodiments, provide functionality in addition to the various options described above. For example, in some embodiments, the hand-held device 10 may allow a user to make use of the device to read books. As with sign reading, described above, the user of the hand-held device utilizes camera 124, positioning the camera so that the text of the book to be read is within the camera's field of view. Software provided on hand-held device 10 converts the text within the camera's field of view to speech, which is then provided to the user of device 10 in audio form. In some embodiments of hand-held device 10, the device may be adapted to recognize important portions of the text, such as text that has been highlighted, and read only those portions of the text to the user. A highlighting function may be provided, accessible either by voice command or via buttons, so that the user can choose to highlight or otherwise mark text that is being read by the device.

Other embodiments of hand-held device 10 may include communications capabilities, allowing the user of hand-held device 10 to communicate with others via cellular, satellite, or other networks. In some embodiments, such services may be provided on a subscription basis, while in other embodiments these features may simply be provided when a user acquires the device. A dedicated service may be provided to assist the user in troubleshooting hand-held device 10, to assist with navigation, or to assist the user when the user has an accident or other emergency. Access to such a service may be provided via voice command or a single button that accesses the services, or in any other suitable manner. The single-action access to a dedicated network may be more efficient than providing generalized voice service, and when the user connects to such a dedicated service, the representative put in communication with the user preferably has access to information from hand-held device 10 provided over a cellular, Wi-Fi, satellite, or other network. Should the user of hand-held device 10 require assistance from emergency personnel, the representative of the dedicated system may contact emergency services on the user's behalf, or may contact other individuals whose names and contact information are stored within the user's profile with the dedicated service. The various ways in which such information may be stored, accessed, and/or transmitted over dedicated or non-dedicated networks are known in the art.

In addition to the above services, or as an alternative thereto, hand-held device 10 may be provided with access to emergency services, such as 911 services, preferably via a single button or voice command. The GPS functionality of hand-held device 10 may be used to provide emergency services personnel with the location of the user, so that emergency personnel may locate the user if necessary, and if the user is not able to direct the emergency personnel personally.

It is contemplated that the foregoing is exemplary of the principles of a hand-held navigation device for the visually-impaired. It is not intended to be limiting, and it is understood that those of skill in the art will perceive various modifications and alternatives to the details set forth herein, upon reading this disclosure. Such alternatives and modifications are considered to be within the spirit and scope of the present invention.

Having thus described the preferred embodiment of the invention, what is claimed as new and desired to be protected by Letters Patent includes the following:

1. A hand-held device for allowing a visually-impaired user to navigate an environment, the device comprising:
    a housing defining an interior space of said device;
    an object location means contained within said housing and having access to an environment external to the housing through an opening therein, the object location means configured to identify the location of objects external to said hand-held device in real time;
    a processor in electronic communication with said object location means and programmed to receive information from the object location means; and
    a speaker in electronic communication with said processor for delivering audio information to a user of said hand-held device,
    wherein the hand-held device is programmed to provide a user of the hand-held device with audio instructions, via said speaker, for navigating through the detected objects.

2. The hand-held device according to claim 1, wherein the object location means is selected from the group consisting of a camera, a radio module, a sonar module, an infrared module, and combinations thereof.

3. The hand-held device according to claim 1, further comprising internal storage for storing data.

4. The hand-held device according to claim 3, wherein the data stored on the internal storage comprises navigation data.

5. The hand-held device according to claim 2, wherein the object location means comprises a camera, and further wherein the hand-held device is programmed to recognize text via said camera, to convert said text to audio information, and to communicate the audio information to the user via the speaker.

6. The hand-held device according to claim 1, further comprising a network communication means for two-way communication with a public or private network.

7. The hand-held device according to claim 6, wherein the network communication means is configured to communicate with a network via at least one of hard-wired, Wi-Fi, cellular, or satellite communications.

8. The hand-held device according to claim 1, further comprising an emergency communications means, whereby actuation of the emergency communications means causes the hand-held device to connect to an emergency communications network.

9. A hand-held device for allowing a visually-impaired individual to navigate an environment, the device comprising:
    a housing;
    a camera attached to said housing;
    a radio module attached to said housing;
    a processor in electronic communication with said camera and said radio module; and
    a speaker in electronic communication with said processor for delivering audio instructions to a user of said hand-held device,
    wherein the hand-held device is a dedicated device for use in navigation by a visually-impaired user, and further wherein said device is programmed to recognize the position of objects in the immediate environment of said hand-held device via said camera and said radio module, and to provide the user of said device with audio instructions, via speaker, for navigating through the detected objects.

10. The hand-held device according to claim 9 further comprising:
    a sonar module attached to said housing; and
    an infrared module attached to said housing,
    the sonar module and infrared module in electronic communication with said processor.

11. The hand-held device according to claim 10 further comprising an internal storage within said housing for storing data therein.

12. A method of navigating an environment, the method comprising the steps of:
    acquiring via a hand-held device information relating to the real-time position of a plurality of objects immediately external to the hand-held device;
    processing the information with the hand-held device, the hand-held device determining a navigation path to allow a user thereof to navigate the plurality of objects in the environment; and
    delivering in audio form, via the hand-held device, instructions to said user regarding the navigation path, thereby instructing the user as to how to navigate through the plurality of objects.

13. The method according to claim 12, wherein the step of acquiring information about the environment to be navigated comprises downloading said information from a network.

14. The method according to claim 13, wherein the step of acquiring information about the environment further comprises direct, real-time acquisition of information about the user's environment, and further comprising the step of rectifying the information downloaded from the network with the real-time information acquired directly by the hand-held device.

15. The method according to claim 12 further comprising the step of tagging a plurality of objects in the environment with tags that the hand-held device can communication with, and determining the position of objects in the environment by determining the position of the tags.

* * * * *